United States Patent

Larsen

[15] 3,664,197
[45] May 23, 1972

[54] CONSTANT TORQUE DEVICE FOR METER READING SYSTEM

[72] Inventor: Elmer L. Larsen, Greenfield, Wis.
[73] Assignee: McGraw-Edison Company, South Milwaukee, Wis.
[22] Filed: Feb. 12, 1971
[21] Appl. No.: 115,005

[52] U.S. Cl.....................................74/1.5, 74/84, 74/112
[51] Int. Cl..........................................F16h 27/04
[58] Field of Search.....................................74/1.5, 84, 112

[56] References Cited

UNITED STATES PATENTS 3,604,274 9/1971 Palmer.....................................74/1.5

Primary Examiner—Milton Kaufman
Attorney—R. J. Falkowski

[57] ABSTRACT

A meter output shaft drives a constant torque device. The constant torque device drives a disc encoding assembly that produces an output indicating the quantity measured by the meter. The constant torque device has a drive dog and eccentric cam assembly rotated by the meter shaft. The drive dog rotates to drive a freely rotating plate through a drive pin on the plate. A double arm spring is positioned to have one spring arm bias against the eccentric cam and the other spring arm against a toggle pin on the plate. On rotation of the shaft, the dog is rotated to move the plate drive pin during a half revolution of the shaft against the biasing of the second spring arm until an overtoggle position is reached at which time the second spring arm shifts the plate 180°. Upon shifting of the plate, a disc toggle pin on the plate drives the disc to change the reading on the disc encoder assembly. Upon overtoggling of the plate, the shaft continues to rotate the eccentric cam against the bias of the first spring arm during the other half revolution of the shaft until the drive dog again engages the plate drive pin.

17 Claims, 3 Drawing Figures

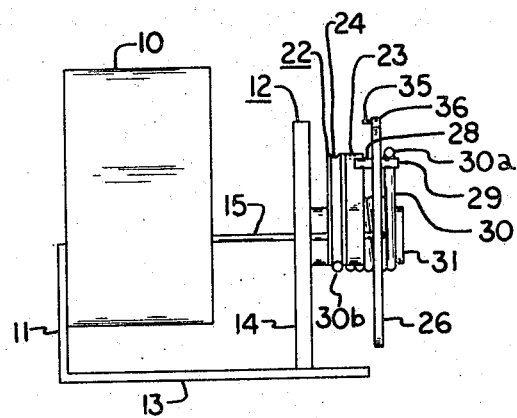
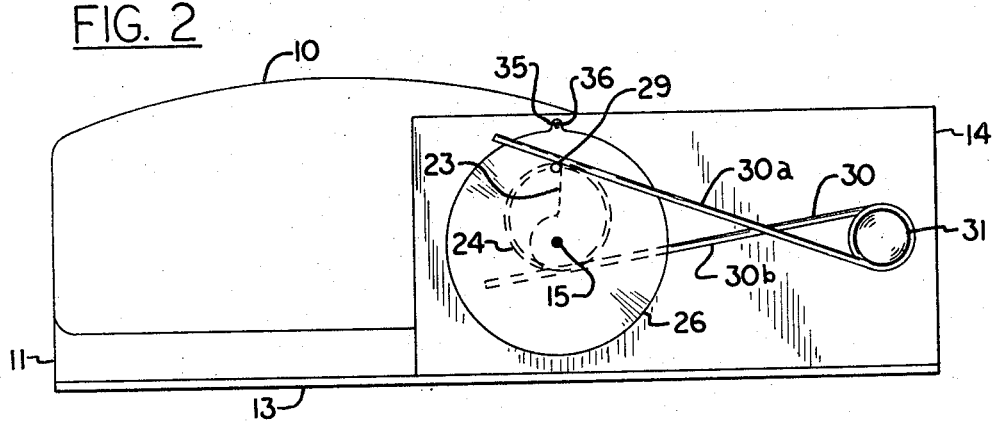
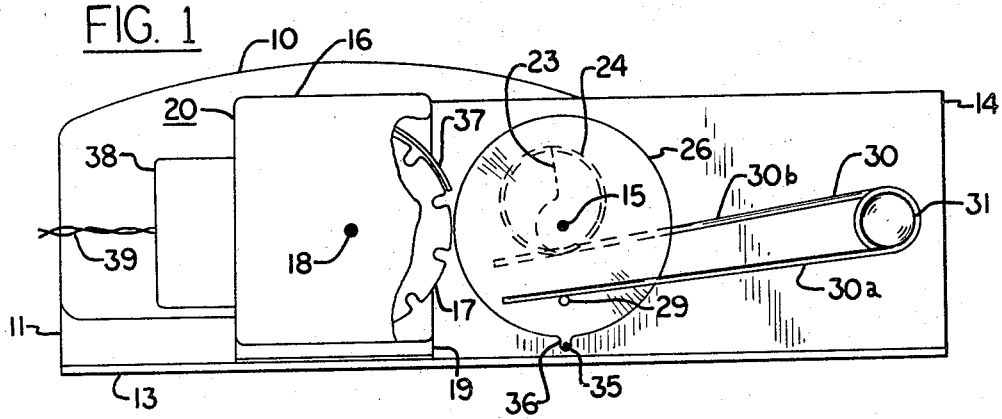

CONSTANT TORQUE DEVICE FOR METER READING SYSTEM

This invention relates to constant torque devices, particularly to constant torque devices for maintaining a constant load on a rotating device such as a meter.

One of the difficulties in providing for automatic meter reading of utility meters is that the meters have to be calibrated under given frictional load conditions in order to obtain the desirable degree of accuracy, and provisions must be made during calibration for the extra energy required to rotate reading devices. This is difficult to accomplish when the load on the meter varies over the period of the circular rotation of the output shaft of the meter. Therefore, it is desirable to provide a constant, and preferably minimum, load for the meter to make it easier to calibrate and adjust.

With this invention a simple and effective constant torque device is attached between a meter and an encoding device. The device applies a substantially constant load to the meter and transfers the incremental measurements of the meter rotation to an encoding device without directly utilizing the rotating meter shaft to move the encoding device. A meter reading system using a constant torque device according to this invention is easier to calibrate, reliable and accurate, and is relatively simple and inexpensive.

Other objects and advantages of the invention will be apparent from the following detailed description.

FIG. 1 is a simplified side view of a meter, constant torque device, and disc encoder assembly according to this invention;

FIG. 2 is a view as in FIG. 1 with the rotating plate in a different position and with the encoder assembly removed; and FIG. 3 is an end view of the assembly as shown in FIG. 2.

Referring to FIG. 1, a meter reading encoding system is shown comprising a meter 10, a constant torque device 12, and a means for indicating the amount of meter shaft movement such as a meter position encoding device 20. Referring to FIG. 3, meter 10 is mounted on a support bracket 11 extending upwardly from a base 13 and has an output shaft 15 rotated by the meter as it is metering some substance, such as, for example, gas, electricity or water, in any manner known in the art. Output shaft 15 is connected to drive constant torque device 12 which is mounted on base 13 by a support bracket 14.

Constant torque device 12 comprises a cam assembly 22 fixedly attached to shaft 15 that comprises an eccentrically mounted semicircular drive dog 23 and an adjacent eccentrically mounted spool cam 24. Device 12 also comprises a rotatable plate 26 mounted to freely rotate on shaft 15, and a plate drive pin 28 attached to plate 26 in a position to be engaged by drive dog 23 upon rotation.

A spring support post 31 is attached to bracket 14 and a spring 30 of a wound coil double-extension or U-type having a first spring arm 30a which provides a first biasing means and a second spring arm 30b which provides a second biasing means interconnected to the first biasing means. Spring 30 is mounted to freely rotate on spring support post 31. Spring 31 provides biasing forces on its spring arms in opposite directions of rotation about support arm 31. A spring toggle pin 29 is mounted on plate 26 and is engaged and biased by spring arm 30a of spring 30. Spring arm 30b is positioned in the grooved track of eccentrically mounted spool cam 24 to engage and bias spool cam 24.

A means for recording rotation of the plate comprises a means for indicating rotation of the plate and encoding device 20. The means for indicating comprises a disc toggle pin 35 mounted on a plate extension 36 on plate 26 extending radially outwardly from plate 26 in a position to engage encoding device 20.

Encoding device 20 may be of any suitable type known in the art and is shown comprising a housing 16, a notched disc 17 rotatable about an axis shaft 18, a support bracket 19 attached to base 13 located to support housing 16 in a position to effect engagement of disc toggle pin 35 and disc 17. Device 20 also comprises a disc latch release arm 37 connected to any type of release mechanism (not shown) known in the art that would release disc 17 for rotation upon being contacted by disc toggle pin 35 as plate 26 rotates to engage a notch on disc 17. Device 20 also comprises any encoding and information carrying means 38 known in the art providing an electrical output along conductors 39 that uniquely indicates each of the positions of disc 17. Additional discs may be provided to give a wider range of position indications in any manner known in the art, as, for example, the type of encoder disclosed in U.S. Pat. No. 3,491,244, Stewart, Jan. 29, 1970, "Radiation Sensitive Position Encoder Using Coded Discs".

In the operation of the device disclosed, meter 10 rotates shaft 15 as a function of the quantity of the substance being measured by meter 10. The rotation of shaft 15 rotates cam assembly 22 in a counterclockwise direction, as appearing in FIGS. 1 and 2. Upon rotation of cam assembly 22, drive dog 23 rotates to engage and drive against plate drive pin 28 to move plate 26 from the position shown in FIG. 1 to the position shown in FIG. 2. Drive dog 23, while driving against toggle pin 28, is acting against the force of biasing spring arm 30a acting on spring toggle pin 29 and is assisted by the biasing of spring arm 30b against the receding eccentric surface of cam 24. When drive dog 23 moves plate 26 to an overtoggle position, just beyond the position shown in FIG. 2, spring arm 30a biases toggle pin 29 downwardly, causing plate 26 to rapidly rotate from the position shown in FIG. 2 to the position shown in FIG. 1.

As the meter rotates drive dog 23 from the position shown in FIG. 1 to the position shown in FIG. 2, the meter is driving against the force of spring arm 30b which is biasing against the eccentric rotation of spool cam 24. Thus, meter shaft 15 drives against the biasing force of spring arm 30b against eccentrically mounted spool cam 24 for one-half of its revolution until drive cam 23 engages plate drive pin 28 at the position shown in FIG. 1. For the other half of the revolution, meter shaft 15 drives against the biasing force of spring 30 by contact with spring arm 30a against toggle pin 29.

The load on the meter is substantially constant and is at a very low level because the loading created by the spring also functions to contribute to rotation of the shaft during part of the rotation. The actual load on the meter can be considered as a function of the angle between the spring arms of spring 30. This results because, considering the spring position just after toggle of plate 26, eccentric spool cam 24 pushes spring arm 30b toward the maximum deflection of arm 30b downward when spool cam is at a position 180° from the position shown in the figures. During the next half revolution of shaft 15, eccentric spool cam 24 allows spring arm 30b to return to the position shown in the figures. During this same half revolution toggle pin 29 is moved against spring arm 30a and both spring arms are moving in the same direction. However, spring arm 30a moves at a faster rate than spring arm 30b so that at the end of this half revolution the angle between the arms is approximately twice the angle between the arms at the beginning of this half revolution. This provides a constant load factor while at the same time storing energy for the toggling of plate 26 and the resultant movement of disc 17. During the next half revolution spring arm 30b is moved while spring arm 30a remains relatively stationary. The torques required to move during each of these half revolutions are, therefore, substantially equal and of a minimal level.

Encoding device 20 is operated during the free moving rotation of plate 26 from the position shown in FIG. 2 to the position shown in FIG. 1. Upon movement of plate 26 from the position shown in FIG. 2 disc toggle pin 35 first strikes disc latch release arm 37 of encoding assembly 20 to release disc 17 for rotation and then engages the encountered notch in disc 17 to rotate disc 17 to the next locked incremental position. Information indicating the position of disc 17 is then provided in any known manner as an output along conductors 39 from encoding and indicating means 38.

I claim:

1. A constant torque device attached to a rotating output shaft of a meter in a meter reading system comprising:

an eccentrically mounted spool cam mounted to rotate with said shaft about an axis;
a drive dog mounted to rotate with said shaft about the axis;
a plate mounted to freely rotate about the axis;
an engaging means for engaging the drive dog and the plate to rotate the plate with the drive dog as the drive dog rotates with the shaft;
a first biasing means for biasing the rotatable plate in a selected direction;
a second biasing means for biasing against the spool cam in a selected direction; and
said spool cam, drive dog, engaging means, and first and second biasing means cooperatively positioned to have the first biasing means biasing against rotation of the plate during one-half of a revolution of the shaft and the second biasing means biasing against rotation of the spool cam during the other half of the revolution of the shaft, and to have said first biasing means rotate the plate through one-half of a revolution of said plate upon completion of the one-half revolution of the shaft.

2. A constant torque device according to claim 1 also comprising a means responsive to the rotation of the plate through the one-half revolution of said plate for indicating the rotation of the plate.

3. A constant torque device according to claim 1 wherein said drive dog and spool are positioned adjacent each other and adjacent the plate.

4. A constant torque device according to claim 3 wherein said means for engaging comprises a plate drive pin on said plate at a position radially outward from the shaft.

5. A constant torque device according to claim 4 wherein said first and second biasing means are interconnected to store energy for rotating the plate through said one-half of a revolution of the plate.

6. A constant torque device according to claim 5 wherein said first and second biasing means comprise a spring support post and a wound coil spring having a first extension arm as the first biasing means and a second extension arm as the second biasing means.

7. A constant torque device according to claim 6 wherein said spring is positioned to freely rotate about said post, said extensions are biased to rotate in opposite directions about said post, said first arm is biased against the toggle pin, and said second arm is biased against the spool cam.

8. A constant torque device according to claim 7 also comprising a means responsive to the rotation of the plate through the one-half revolution of said plate for indicating the rotation of the plate.

9. A constant torque device according to claim 1 wherein said means for engaging comprises a plate drive pin on said plate at a position radially outward from the shaft.

10. A constant torque device according to claim 1 wherein said first and second biasing means are interconnected to store energy for rotating the plate through said one-half of a revolution of the plate.

11. A constant torque device according to claim 10 also comprising a means responsive to the rotation of the plate through the one-half revolution of said plate for indicating the rotation of the plate.

12. A constant torque device according to claim 1 wherein said first and second biasing means comprise a spring support post and a wound coil spring on said support post having a first extension arm as the first biasing means and a second extension arm as the second biasing means.

13. A constant torque device according to claim 9 wherein said spring is positioned to freely rotate about said post, said arms are biased to rotate in opposite directions about the post, said first arm is biased against the toggle pin, and said second arm is biased against the spool cam.

14. A constant torque device according to claim 13 also comprising a means responsive to the rotation of the plate through the one-half revolution of said plate for indicating the rotation of the plate.

15. A constant torque device for attachment to a rotating output shaft of a meter in an automatic meter reading system comprising:
a cam assembly adapted to rotate with the shaft about an axis comprising an eccentric cam and a drive dog positioned adjacent the maximum radius portion of the surface of said eccentric cam;
a rotatable plate mounted to freely rotate about the axis;
a plate drive pin on the plate positioned to be engaged by the drive dog;
a spring toggle pin positioned on the plate axially adjacent the plate drive pin;
a spring mounted to be freely rotatable about a spring axis having a first arm and a second arm biased to rotate about the spring axis in opposite directions; and
said spring positioned to bias said first arm against the toggle pin and said second arm against the eccentric cam.

16. A constant torque device attached to a rotating output shaft of a meter in an automatic meter reading system comprising:
a cam assembly fixedly attached to the shaft to rotate about the shaft axis comprising an eccentric cam and an adjacent drive dog positioned axially adjacent the maximum radius portion of the surface of said eccentric cam;
a rotatable plate mounted on the shaft to freely rotate about said shaft and adjacent to the drive dog of the cam assembly;
a plate drive pin on the side of the plate adjacent the drive dog and positioned radially outwardly from the shaft axis in a position to be engaged by said drive dog;
a spring toggle pin positioned on the plate on the side away from the cam assembly and positioned axially adjacent the plate drive pin;
a spring support post fixedly positioned relative to the meter and extending generally parallel to the shaft axis;
a wound coil spring mounted on and freely rotatable about the support post having a first arm and a second arm biased to rotate about the support post in opposite directions;
said support post and spring positioned to bias the first spring arm against the spring toggle pin and the second spring arm against the eccentric cam; and
a means on the plate for transferring motion from said plate during rotation of said plate by the first spring arm.

17. A constant torque device according to claim 16 wherein said means for indicating comprises a radial extension on the plate and a toggle pin on said extension.

* * * * *